United States Patent [19]
Wolfer

[11] 4,088,015
[45] May 9, 1978

[54] FORCE MEASURING APPARATUS WITH MOUNTING ARRANGEMENT

[75] Inventor: Peter Wolfer, Kleinandelfingen, Switzerland

[73] Assignee: Kistler Instrumente AG, Switzerland

[21] Appl. No.: 725,724

[22] Filed: Sep. 23, 1976

[30] Foreign Application Priority Data

Sep. 26, 1975 Switzerland ............... 012489/75

[51] Int. Cl.² ............................................. G01L 1/16
[52] U.S. Cl. ............................. 73/141 R; 73/DIG. 4
[58] Field of Search .......... 73/141 R, 141 A, DIG. 4; 310/8.7

[56] References Cited

U.S. PATENT DOCUMENTS

| | | | |
|---|---|---|---|
| 3,151,258 | 9/1964 | Sonderegger et al. | 73/DIG. 4 |
| 3,566,163 | 2/1971 | Fischer et al. | 310/8.7 X |
| 3,614,488 | 10/1971 | Sonderegger et al. | 73/DIG. 4 |
| 3,636,760 | 1/1972 | Shoberg | 73/141 A |
| 3,788,133 | 1/1974 | Paelian et al. | 73/141 A |

Primary Examiner—Charles A. Ruehl
Attorney, Agent, or Firm—Craig & Antonelli

[57] ABSTRACT

A force measuring apparatus with a mounting arrangement for incorporation between a force receiving plate and a base plate of a force measuring system. The force measuring apparatus has an axis extending substantially transversely to the force receiving plate and base plate and is provided with two force transmitting flanges having planar parallel mounting surfaces at the ends thereof. The flanges are arranged for receiving mounting screws for mounting the force measuring apparatus from the same side to both the force receiving plate and base plate and centrally with respect to the axis of the force measuring apparatus with the force measuring apparatus having force transmission surfaces thereof coinciding with the mounting surfaces.

19 Claims, 3 Drawing Figures

FORCE MEASURING APPARATUS WITH MOUNTING ARRANGEMENT

The present invention relates to a force measuring apparatus with a mounting arrangement for mounting between a force receiving plate and a base plate.

Electronic force measuring members are located between force transmitting devices for the electrical measurement of forces, such as in weighing processes, impact operations, repelling operations, emptying processes, etc. In most cases, three, four or more force measuring members are required, which are mounted between the force receiving construction and the support construction. The major part of force measuring members currently used are only sensitive along one measiuring axis and are equipped with strain gauges. However, force measuring members are currently available operating on a capacitive, inductive and piezoelectric basis. In most cases, the force measuring members are located between the transmission members such that the transmission of force takes place solely in the measuring axis and no pushing forces must be received. The simultaneous occurrence of pushing forces and measuring forces must be prevented under all circumstances in conventional force measuring members, otherwise considerable measuring errors occur, in particular in DMS force measuring members. The arangement of one or more force measuring members between two rigid plates may be considered as the simplest construction of force measuring devices. This arrangement is chosen particularly in the construction of force measuring platforms. Examples of such platforms are shown in Swiss Patent Specification No. 502,590, the latter are currently on the market.

In the construction of large platforms, such as are used for example in impact tests of automobiles, in the so-called crash tests, particular attention should be paid to the precise mounting of the components. Such platforms, which have dimensions of several meters and weights of several tons, are divided into individual platforms with each platform having a weight such that it cannot be assembled in the assembly workshop, but is assembled at the construction site where the test stand is located. With platforms of this type wherein very high forces occur, the plates and force measuring members must therefore be correspondingly rigid. In order to achieve the least possible deformation, material thicknesses of the base plates and force receiving plates of from 50 to 100 mm are necessary. Normally, the base plates are anchored directly in the concrete of the solid impact support. However, the base plates may also be constructed as rails, which are cast in the concrete. The assembly of the individual platforms, wherein each platform consists of the force receiving plate and a plurality of geometrically arranged force measuring members, is carried out such that the force receiving plate with the pre-assembled force measuring members touches the base plate until perfect seating of all the mounting surfaces is ensured. The unit is then screwed to the base plate. Thus, difficulties are encountered in assembly and measurement.

It is therefore an object of the present invention to provide a force measuring apparatus which overcomes the drawbacks of the prior art.

In accordance with the present invention, there is provided a force measuring apparatus of particular shape which enables a mounting operation between a force receiving plate and a base plate solely with the force measuring apparatus. Due to the concrete wall or support surface for the base plate, the rear side of the base plate is not accessible. Thus, the present invention provides for mounting which is effected from only one side.

According to a feature of the present invention, platforms which are equipped with the force measuring apparatus of the present invention permit very accurate monitoring of impact operations, not only in one component direction, but in several component directions. Moreover, the distribution of impact forces may also be measured. It is noted that the present invention is not limited to such platforms, but is utilizable wherever platforms are to be mounted on walls or on floor spaces. Considerable improvements in the measuring accuracy are achieved according to the present invention by providing a force measuring apparatus with force transmitting surfaces and mounting surfaces which spatially coincide.

These and other objects, features and advantages of the present invention will become more apparent when taken in connection with the accompanying drawing, which shows for purposes of illustration only, several embodiments in accordance with the present invention and wherein.

Figure 1:
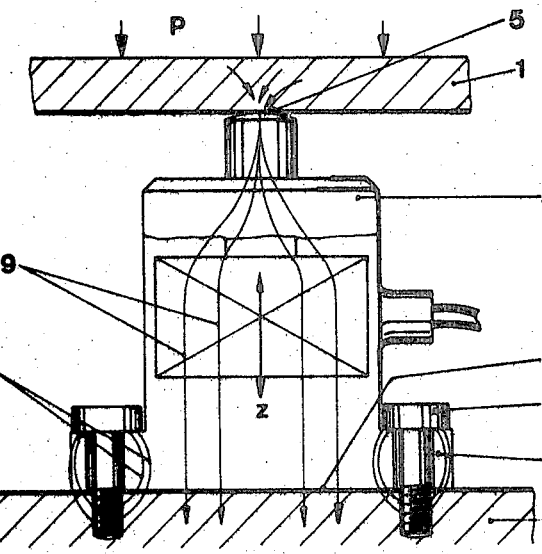
FIG. 1 shows a commercial force measuring cell on the DMS principle.

FIG. 1 shows a cutaway portion of a force mesuring platform having a force receiving plate 1 and a base plate 2. A commercial, for example DMS force measuring member 3 is located therebetween. Such measuring members are provided with a flat mounting surface 4 on only one side with the force introducing surface 5 generally being constructed as a cup, e.g., rounded or the like, in order that no bending moments are introduced. Moreover, forces in a direction other than a measuring direction Z must be kept away from such force measuring members, because they lead to excessive errors. Therefore, special members must be used for the lateral positioning of the force receiving plate 1, which members are not shown. However, undesirable parallel paths for the transfer of force occur, so that the force measuring member can record only parts of the latter. Assembly of such force measuring members generally takes plate by means of a web flange 6, which is screwed to the base plate 2 with a row of screws 7. The lines of force 8 of the mounting screws and the lines of force 9 of the measuring force P are located in different transmitting surface areas. The measuring arrangement illustrated is therefore subject to uncertainties and inaccuracies.

Figure 2:
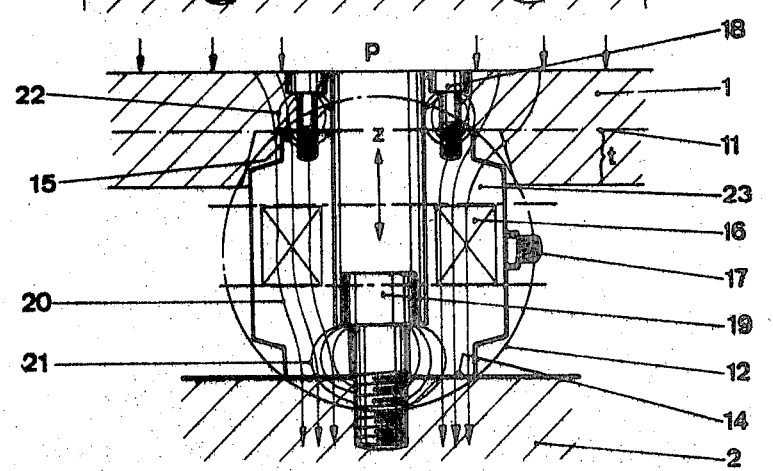
FIG. 2 shows a force measuring apparatus with mounting arrangement according to the invention.

These above-noted difficulties are completely removed according to the present invention. As shown in FIG. 2, a force measuring apparatus 23 is once more located between the force receiving plate 1 and base plate 2. The force measuring apparatus 23 has virtually the ideal geometric shape of a sphere or ball 12, which would produce the best suited force transmission between the two plates, but is ruled out for manufacturing reasons.

As an approximation of the latter, the apparatus 23 is substantially cylindrical with the mounting surfaces 14, 15 being kept to a minimum with respect to the total diameter of the force measuring apparatus. Mounting screws 18 and a central screw 19 are arranged coaxially or concentrically with respect to the axis of sensitivity Z of the force measuring apparatus 23 and may be mounted through the force receiving plate 1 as shown. The lines of force 20 of the transmission force P and the lines of force 21, 22 of the initial stressing force of the mounting screws are located on the same surface areas, i.e. they coincide with one another. This has the great advantage that, for example, a plurality of force mesuring apparatus 23 of an entire platform may be calibrated in the factory and that virtually no errors are introduced into the measuring system by the assembly, which errors could be due for example to split spring action. Additionally, the mounting surfaces 14, 15 are reduced to a minimum to prevent bending of the assembly, which could have repercussions on the measuring cell 16 of the force measuring apparatus 23. The output of the measuring cell 16 is obtained at the output coupling 17.

In order that any bending of the force receiving plate 1 exerts the smallest possible pushing effect on the rigidly mounted force measuring apparatus 23, the mounting surface 15 is countersunk into the surface of the force transmitting plate 1 by a depth $t$ such that it comes to lie close to the neutral region 11 of the force receiving plate 1. The position of the neutral zone may be ascertained by known calculation methods and does not necessarily coincide with the central line of the plate 1. The rigid mounting arrangement according to the present invention can be achieved only with measuring elements measuring force, but not measuring elongation. Piezoelectric measuring members, which in the case of a single component arrangement, are largely insensitive to bending and pushing forces, are particularly suitable as measuring elements. In addition, due to their high mechanical load carrying capacity and rigidity and despite the heavy force of receiving plates 1, they produce sufficiently high inherent frequencies, which ensure that impact processes can be recorded faithfully.

Figure 3:
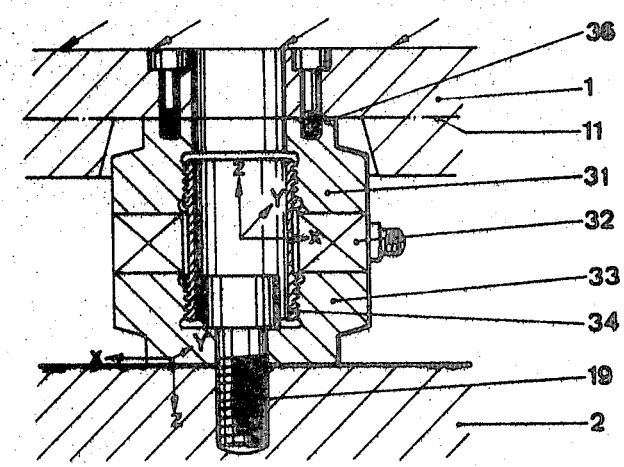
FIG. 3 shows a further force measuring apparatus with mounting arrangment according to the invention.

FIG. 3 shows a further arrangement according to the present invention wherein the force measuring apparatus consists of an upper force transmitting flange 31, an annular commercial multi-component force measuring member 32, a lower force transmitting flange 33 and a tubular pre-tensioning means 34. The lower mounting screw 19 may be inserted through the pre-tensioning means 34 and assembled from the force receiving plate 1. The high contact pressures which are possible in the case of small mounting surfaces, at the same time as the transmission of Z forces, ensure the transmission of high forces in the X and Y direction, which occur as pushing forces. The upper mounting surface 36 is located as close as possible to the neutral region 11. A single component annular force measuring member 32 may be used in place of a multi-component member.

The force measuring apparatus with mounting arrangement according to the present invention thus facilitates the construction of very large measuring platforms. The shape of the force measuring apparatus is based on the ideal spherical shaped and provides the combination of minimal mounting surfaces and practical maneuverability of the latter from the force introduction side. Moreover, the provision that mounting surfaces and force transmitting surfaces are identical, prevents mounting influences and measuring errors due to any split spring action, in the mounting surfaces. It is therefore possible for the first time that complete measuring platforms can be constructed with the individual force measuring apparatus thereof being calibrated in the factory, without the latter having to be calibrated in the field after the assembly work, which would be possible only at very high costs in the case of large installations. For the first time, the invention makes it possible to produce large impact or force receiving walls, which consist of a plurality of individual platforms, which are combined to form a mosaic and can all be assembled from the force introduction side. The invention thus develops new technical possibilities by providing a force measuring member with mounting arrangement, which facilitates high precision assembly in the field. Pushing effects are reduced to a minimum by securing the force receiving plates as close as possible to the neutral phase or region.

While I have shown and described several embodiments in accordance with the present invention, it is understood that the same are not limited thereto but is susceptible of numerous changes and modifications as known to those akilled in the art and I therefore do not wish to be limited to the details shown and described herein but intend to cover all such changes and modifications as are encompassed by the scope of the appended claims.

I claim:

1. A force measuring apparatus with a mounting arrangement for incorporation between a force receiving plate and a base plate of a force measuring system, said force measuring apparatus having an axis extending substantially transversely to said force receiving plate and base plate and provided with two force transmitting flange means having planar parallel mounting surfaces at the ends thereof, said flange means being arranged for receiving mounting screws for mounting said force measuring apparatus in the assembled condition thereof from the same side to and between said force receiving plate and said base plate and symmetrically with respect to the axis of said force measuring apparatus, said force measuring apparatus having force transmission surfaces coinciding with said mounting surfaces, said force measuring apparatus comprising four modular components, said modular components including an electromechanical force measuring ring, said two force transmitting flange means and a central tubular pretensioning member, said force transmitting flange means having said planar parallel end surfaces provided with the smallest cross-sectional dimension sufficient for the lines of force caused by the mounting screws and the lines of force caused by the forces to be measured to extend along substantially the same path.

2. A force measuring apparatus according to claim 1, wherein the lines of force caused by the mounting screws and the lines of force caused by the forces to be measured coincide.

3. A force measuring apparatus according to claim 2, wherein said electromechanical force measuring ring is responsive to force in more than one measuring direction.

4. A force measuring apparatus according to claim 2, wherein said mounting surfaces of said flange means are substantially cylindrical and have a diameter smaller than the diameter of said force measuring ring.

5. A force measuring apparatus according to claim 2, wherein said force measuring apparatus is mounted such that no bending of said mounting surfaces occur whereby said electromechanical force measuring apparatus provides correct measurements.

6. A force measuring apparatus according to claim 2, wherein the force receiving plate includes a neutral axis and said mounting surface of said flange means for connection with said force receiving plate is disposed in the region of the neutral axis of said force receiving plate.

7. A force measuring apparatus according to claim 2, wherein said force receiving plate includes a countersunk portion and one of said flange means is disposed therein.

8. A force measuring apparatus according to claim 1, wherein said force measuring apparatus includes an axially extending bore, one of said mounting screws being arranged in said bore for mounting said force measuring apparatus to said base plate and others of said mounting screws being symmetrically arranged with respect to said bore for mounting said force measuring apparatus to said force receiving plate.

9. A force measuring apparatus with a mounting arrangement for incorporation between a force receiving plate and a base plate of a force measuring system, said force measuring apparatus having an axis extending substantially transversely to said force receiving plate and base plate and provided with two force transmitting flange means having planar parallel mounting surfaces at the ends thereof, said flange means being arranged for receiving mounting screws for mounting said force measuring apparatus in the assembled condition thereof from the same side to and between said force receiving plate and said base plate and symmetrically with respect to the axis of said force measuring apparatus, said force measuring apparatus having force transmission surfaces coinciding with said mounting surfaces, said force measuring apparatus including an axially extending bore, one of said mounting screws being arranged in said bore for mounting said force measuring apparatus to said base plate and others of said mounting screws being symmetrically arranged with respect to said bore for mounting said force measuring apparatus to said force receiving plate.

10. A force measuring apparatus according to claim 9, wherein said force measuring apparatus is substantially cylindrical and having planar end surfaces.

11. A force measuring apparatus according to claim 10, wherein said force measuring apparatus comprises four modular components, said modular components including an electromechanical force measuring ring, said two force transmitting flange means, and a central tubular pretensioning member extending in the axial direction of said force measuring apparatus, said force transmitting flange means having said planar end surfaces provided with the smallest diameter sufficient for the lines of force caused by the mounting screws and the lines of force caused by the forces to be measured to extend along substantially the same path.

12. A force measuring apparatus according to claim 11, wherein the lines of force caused by the mounting screws and the lines of force caused by the forces to be measured coincide.

13. A force measuring apparatus according to claim 10, wherein the force receiving plate includes a neutral axis and said mounting surface of said flange means for connection with said force receiving plate is disposed in the region of the neutral axis of said force receiving plate.

14. A force measuring apparatus according to claim 10, wherein said force receiving plate includes a countersunk portion and one of said flange means is disposed therein.

15. A force measuring apparatus with a mounting arrangement for incorporation between a force receiving plate and a base plate of a force measuring system, said force measuring apparatus having an axis extending substantially transversely to said force receiving plate and base plate and provided with two force transmitting flange means having planar parallel mounting surfaces at the ends thereof, said flange means being arranged for receiving mounting screws for mounting said force measuring apparatus in the assembled condition thereof from the same side to and between said force receiving plate and said base plate and symmetrically with respect to the axis of said force measuring apparatus, said force measuring apparatus having force transmission surfaces coinciding with said mounting surfaces, said flange means being arranged for receiving a first mounting screw along the axis of said force measuring apparatus and a plurality of second mounting screws symmetrically arranged with respect to the axis of said force measuring apparatus for mounting said assembled force measuring apparatus from the same side between said force receiving plate and said base plate.

16. A force measuring apparatus according to claim 15, wherein said force measuring apparatus comprises four modular components, said modular components including an electromechanical force measuring ring, two force transmitting flange means, and a central tubular pretensioning member.

17. A force measuring apparatus according to claim 16, wherein the lines of force caused by said first and second mounting screws and the lines of force caused by the forces to be measured coincide.

18. A force measuring apparatus according to claim 17, wherein said electromechanical force measuring ring is responsive to force in more than one measuring direction.

19. A force measuring apparatus according to claim 16, wherein said central tubular pretensioning member extends in the axial direction of said force measuring apparatus, said force transmitting flange means having planar end surfaces provided with the smallest diameter sufficient for the lines of force caused by said mounting screws and the lines of force caused by the force to be measured to extend along substantially the same path.

* * * * *